United States Patent [19]

Bellinghausen et al.

[11] Patent Number: 5,095,786

[45] Date of Patent: Mar. 17, 1992

[54] METHOD AND APPARATUS FOR DAMPENING BRAKE LATHE VIBRATION

[75] Inventors: Thomas G. Bellinghausen, Conway, Ark.; Eric Doyle, Menlo Park, Calif.; Ronald D. Swayne, Sherwood, Ark.; Weldon B. Ellege, Conway, Ark.

[73] Assignee: FMC Corporation, Chicago, Ill.

[21] Appl. No.: 612,347

[22] Filed: Nov. 13, 1990

[51] Int. Cl.$^5$ ............................ B23B 5/02; F16F 15/10
[52] U.S. Cl. .............................. 82/112; 51/217 T; 51/237 R; 82/163; 74/574; 409/141
[58] Field of Search .................... 82/1.11, 112, 163; 51/217 T, 236, 237 R, 216 T; 29/DIG. 46; 408/143; 409/141; 74/574

[56] References Cited

U.S. PATENT DOCUMENTS

| 2,505,120 | 4/1950 | Jackson | 74/574 |
| 3,823,627 | 7/1974 | Scharfen | 82/112 |
| 4,126,066 | 11/1978 | Wagor et al. | 82/112 |
| 4,455,900 | 6/1984 | Callanan et al. | 82/112 |

FOREIGN PATENT DOCUMENTS

| 3336174 | 5/1985 | Fed. Rep. of Germany | 74/574 |
| 83947 | 3/1989 | Japan | 74/574 |
| 83950 | 3/1989 | Japan | 74/574 |
| 98730 | 4/1989 | Japan | 74/574 |
| 430250 | 10/1974 | U.S.S.R. | 74/574 |

Primary Examiner—Daniel W. Howell
Attorney, Agent, or Firm—Douglas W. Rudy; Richard B. Megley

[57] ABSTRACT

The invention is directed to a brake lathe having a device to eliminate or reduce vibration. Various types of dampers may be mounted on the arbor shaft of the lathe.

5 Claims, 4 Drawing Sheets

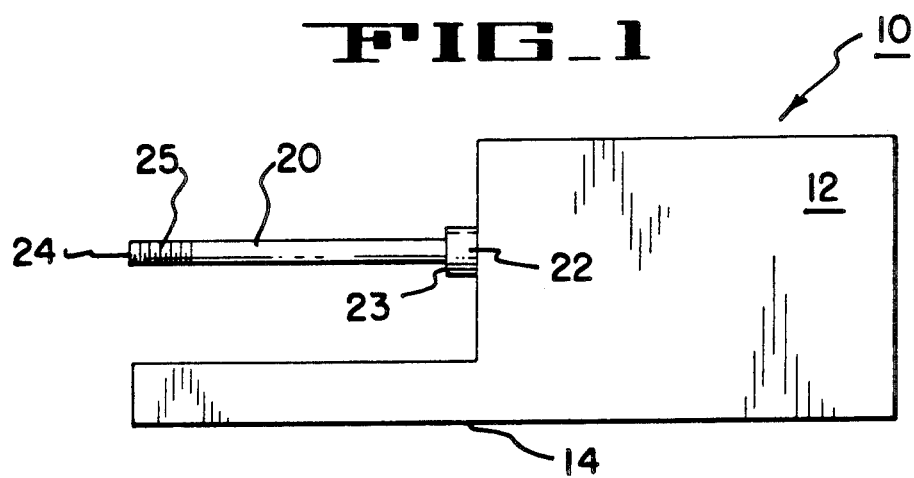
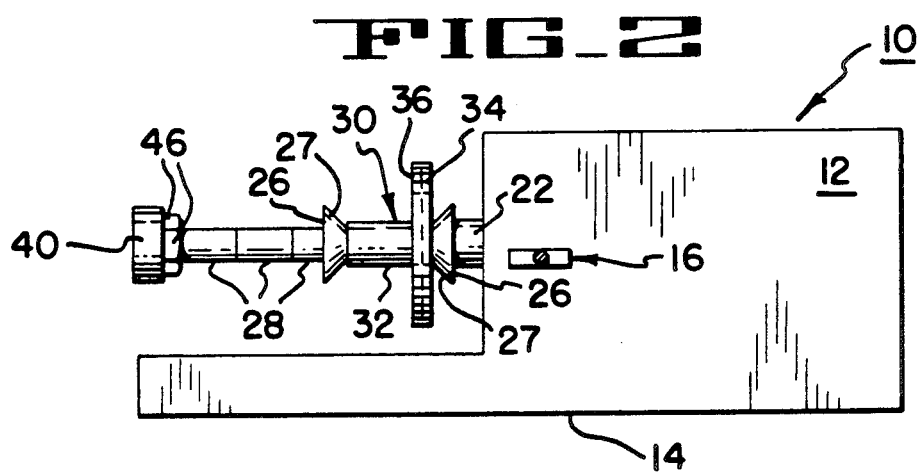
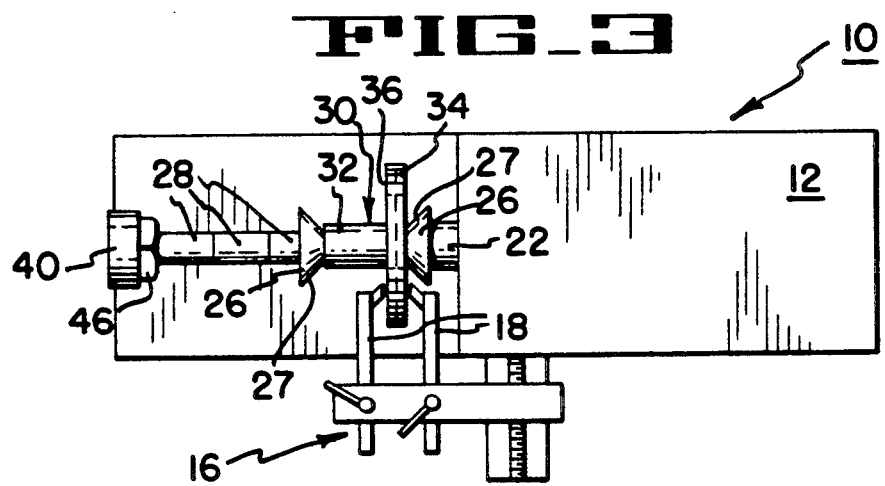

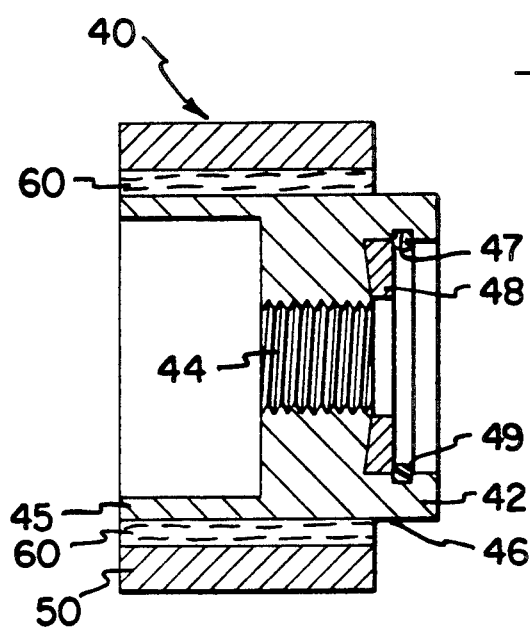
FIG_4
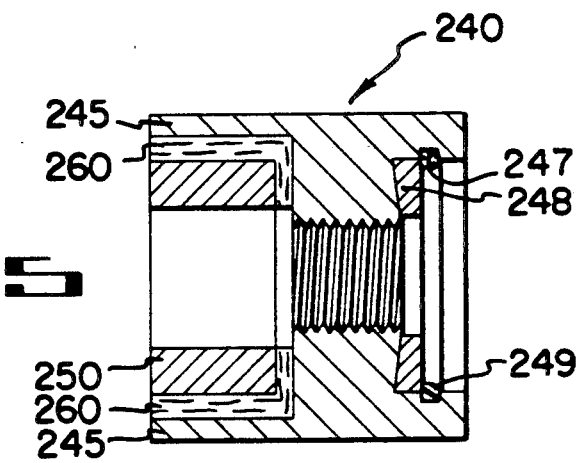
FIG_5
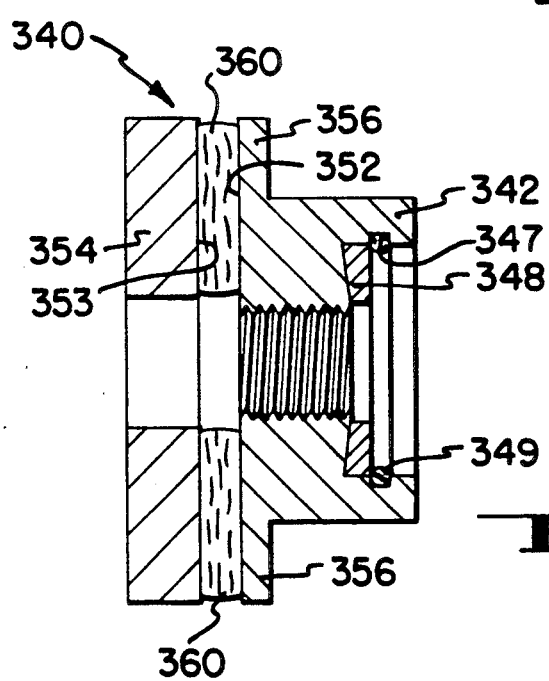
FIG_6

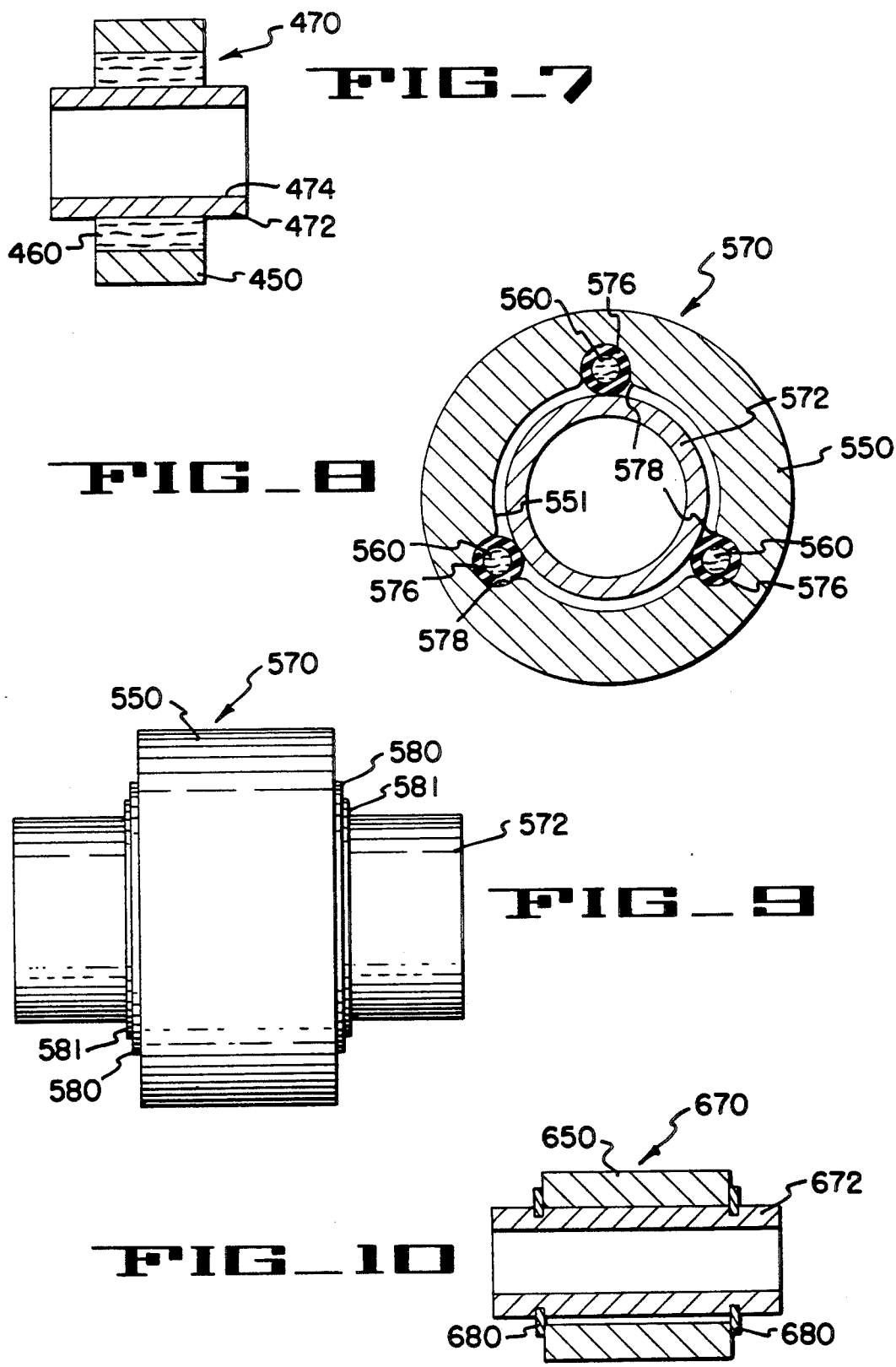

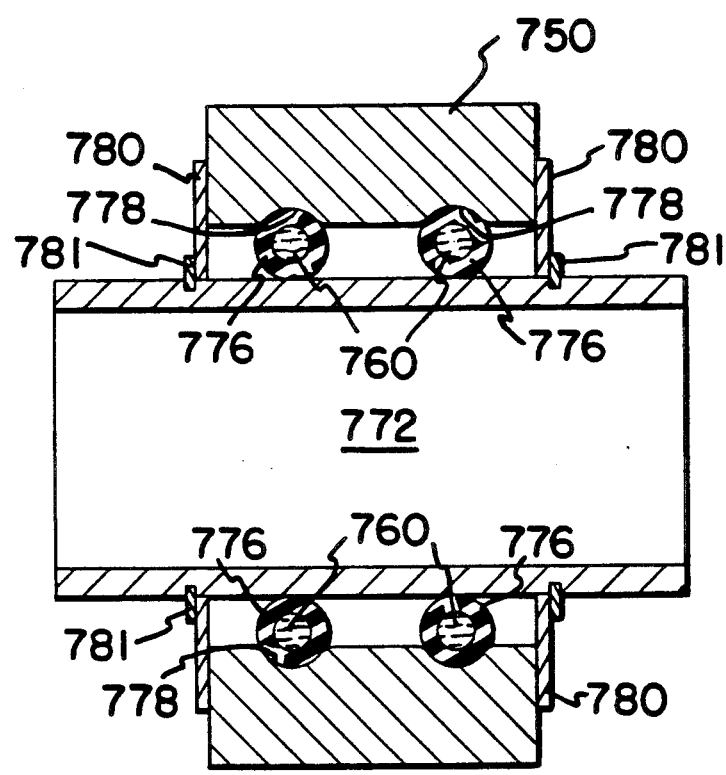

METHOD AND APPARATUS FOR DAMPENING BRAKE LATHE VIBRATION

FIELD OF ART

The present invention relates to lathes, and more particularly to lathes having arbor shafts extending from a base which is rotatably mounted on a lathe body to a free distal end. Most particularly the present invention relates to brake lathes having cantilevered, free-ended arbor shafts.

BACKGROUND OF THE INVENTION

Brakes of automobiles, tractors and other vehicles utilize friction between opposing surfaces to resist or stop rotation of the vehicle wheels. In automobiles and trucks, a brake shoe is forced outwardly against an internal braking surface of a cylindrical drum constrained to rotate with the wheel, or opposing pads of a brake caliber squeeze a rotor disk constrained to rotate with a vehicle wheel. The braking surfaces of these drums and rotor disks may become damaged by dirt and other foreign matter or by protruding rivets or other irregularities in the shoe or pad braking surface resulting in decreased braking performance. From time to time, braking surfaces of the drums and rotors may be restored to satisfactory condition by turning the drum or rotor on a lathe and cutting away material with a cutting tool to produce a restored, braking surface.

Brake lathes used for this purpose commonly have cantilevered, free-ended arbor shafts upon which the drum or rotor work piece is mounted for turning. Under certain machining conditions, depending upon the size of the work piece, depth of cut and radial distance of the cutting tool from the arbor shaft, vibration of the free-ended arbor shaft may occur and cause movement of the cutting plane of the work piece. Tool chatter which occurs under such conditions results in an unacceptably rough machined surface.

DISCLOSURE OF THE INVENTION

It is an object of the present invention to eliminate or minimize tool chatter and vibration of the arbor shaft of a brake lathe to produce satisfactory braking surface during all brake surface machining operations.

It is a further object of the present invention to produce a satisfactory braking surface during all modes of operation with minimum increased costs of manufacture of the brake lathe.

It is also an object of the present invention to produce an efficient method of eliminating or reducing vibration of a brake lathe arbor shaft which may be incorporated in newly manufactured brake lathe machinery or retrofit to existing lathes.

A brake lathe comprising a first embodiment of the present invention includes an arbor shaft rotatably mounted on a lathe body at a base end, and extending outwardly away from the lathe body to a free distal end. The distal end of the arbor shaft is threaded to engage a locking nut. When a work piece, such as a brake rotor, is to be machined, the rotor and two collets, each having a tapered surface, are first placed on the arbor shaft with a hub of the rotor positioned between the collets and each end of the hub an abutment with a tapered collet surface. Spacer rings are then placed on the arbor shaft and a locking nut is threaded onto the distal end of the shaft and draw down against the spacer rings to compress the rings, collets and hub against an arbor shaft base shoulder, causing the center bore of the brake rotor to become centered about the arbor shaft and the shaft, lock nut, spacer rings, collets and hub to be rotatably locked together by friction.

In a first embodiment of the invention, the locking nut includes a central threaded bore adapted to be threaded onto the distal end of the arbor shaft to compress the spacer rings and collets, and an outer inertial ring, suspended about an inner locking nut body by an elastic dampening material interposed therebetween.

In a second embodiment, the inertial ring is suspended within an outer cylindrical portion of the locking nut body by an elastic dampening material interposed therebetween.

A third embodiment comprise a spacer ring including an inner sleeve, sized to fit about the arbor shaft, and an outer inertial ring suspended about the spacer sleeve by an elastic damping material imposed therebetween.

In each of the embodiments, any vibration of the arbor shaft which may occur is immediately dampened by dissipation of energy in the damping material and damping forces exerted upon the arbor shaft by the elastic damping material.

Thus, the method of the present invention for dampening vibration of the arbor shaft and work piece during a machining operation comprises the steps of providing a ring-shaped inertial body having mass, positioning the ring-shaped body to encircle the arbor shaft, and interposing an elastic damping material between the shaft and the surrounding inertial body such that a dampening force is exerted upon the shaft upon occurrence of shaft vibration.

These and other features, advantages and objects of the present invention will be readily understood upon perusal of the detailed description together with the figures in which:

BRIEF DESCRIPTION OF THE DRAWINGS

FIG. 1 is an elevation view of a partially assembled exemplary brake lathe comprising an embodiment of the present invention.

FIG. 2 is a front elevation view of an exemplary brake lathe comprising an embodiment of the present invention with a rotor mounted upon the arbor shaft.

FIG. 3 is a plan view of an exemplary brake lathe comprising an embodiment of the present invention with a rotor mounted on the arbor shaft.

FIG. 4 is a sectional view of a lock nut of an exemplary brake lathe comprising an embodiment of the present invention.

FIG. 5 is a sectional view of a lock nut of a brake lathe comprising an alternative embodiment of the present invention.

FIG. 6 is a sectional view of a lock nut of an exemplary brake lathe comprising a third embodiment of the present invention.

FIG. 7 is a sectional view of a spacer ring of an exemplary brake lathe comprising a fourth embodiment of the present invention.

FIG. 8 is a sectional view of a spacer ring of an exemplary brake lathe comprising a fifth embodiment of the present invention.

FIG. 9 is a side view of a spacer ring of an exemplary brake lathe comprising a fifth embodiment of the present invention.

FIG. 10 is a sectional view of a spacer ring of an exemplary brake lathe comprising a sixth embodiment of the present invention.

FIG. 11 is a sectional view of a spacer ring of an exemplary brake lathe comprising a seventh embodiment of the present invention.

DETAILED DESCRIPTION

Brake lathe 10 comprising an exemplary preferred embodiment of the present invention is shown in FIG. 1 and includes lathe body 12 having base 14 for mounting on a supporting surface. Arbor shaft 20 is rotatably attached to body 12 at base 22 and extends along a longitudinal axis to free end 24. As shown in FIG. 2, when a work piece, for example brake rotor 30 having disk 32 and hub 34, is to be reconditioned, it is placed on arbor shaft 20 between collets 26. Spacer rings 28 are then placed on arbor shaft 20, which is sufficiently long to accommodate a range of rotor hub widths, and locking nut 40 is threadably engaged with threads 25 of arbor shaft 20 and drawn down against spacer rings 28 to compress rings 28, collets 26, and rotory hub 32 axially along arbor shaft 20 against arbor shaft base shoulder 23 such that hub 32 is centered about arbor shaft 20 by conical surfaces 27 of collets 26. Tightening lock nut 40 also frictionally locks spacer rings 28, collets 26, hub 32 and lock nut 40 to rotate as a unit with arbor shaft 20. A motor, not shown, is located within lathe body 12 to rotate arbor shaft 20 and rotor 30 when mounted thereon.

Referring to the plan view of FIG. 3, after rotor 30 is mounted on shaft 20, tool holder 16 is arranged to hold cutting tools 18 in cutting engagement with braking surfaces 36 of disk 34 to cut material from surfaces 36 as rotor 30 is rotated by the lathe motor. When lathe 10 is used to restore braking surfaces 36, tool holder 16 is first positioned to hold tools 18 close to arbor shaft 20, inboard or braking surfaces 36, and tools 18 are set to the desired cutting depth. Tool holder 16 then moves radially outward away from arbor shaft 20 as arbor shaft 20 and rotor 30 are rotated by the lathe motor to remove high portions from the entirety of surfaces 36 and produce a planar braking surface.

As may be seen in the detailed sectional view of FIG. 4, lock nut 40 of lathe 10 comprising a preferred embodiment of the present invention includes a nut body 42 with inner threaded bore 44 for engagement with threads 25 of distal end 24 of arbor shaft 20. Flats 46 are provided on nut body 40 to allow nut body 40 to be turned with a wrench tool after engagement of the threads to compress spacer rings 28, collets 26 and hub 32 axially along arbor shaft 20 against arbor shaft base shoulder 23. During compression, washer 48 acts against spacer rings 26. When nut 40 is removed from arbor shaft 20, washer 48 is retained by retrainer ring 49 seated in groove 47.

Nut body 42 of locking nut 40 of the exemplary embodiment of FIG. 4 includes an extended sleeve portion 45. Inertial ring 50 surrounds sleeve portion 45 of nut body 42, and is suspended about nut body 42 by elastic damping material 60. Inertial ring 50 may be fabricated of any suitably dense material, for example lead or steel. Elastic damping material 60 may be any material of suitable elasticity and suitable damping qualities. Elastic damping material 60 may be selected for maximum performance in a particular application by experimentation. For example, elastic damping material 60 may be a silicone adhesive sealant. For some applications clamping material 60 may be a fluid which has only damping properties and little or no elasticity, for example a putty of liquid oil. When fluids are utilized, caps, O-rings or other devices, such as a toroidal bladder, must be utilized to prevent loss of fluid from the annular space between inertial ring 50 and nut body 42.

When lock nut 40 is in place during machining of a work piece, radial vibration of free-end 24 is transmitted to nut body 46 and dampened by energy dissipation in elastic damping material 60 confined between nut body 42 and inertial mass 50 as it is deformed by the vibration.

Thus, the method of the present invention for dampening vibration of an arbor shaft and work piece of a brake lathe during machining operations comprises the steps of providing a ring-shaped inertial body having mass, positioning the ring-like body to encircle the arbor shaft, and interposing an elastic damping material between the inertial body and the shaft such that vibration of the shaft will cause distortion of the elastic damping material and vibration of the shaft will thereby be dampened.

Locking nut 240 of an alternative exemplary embodiment of the present invention is shown in section in FIG. 5. In the embodiment of FIG. 5, inertial ring 250 is suspended within cylindrical extension 245 by elastic damping material 260 interposed between cylindrical extension 245 and inertial ring 250.

Lock nut 340 of a third embodiment comprising the present invention is shown in FIG. 6. In the embodiment of FIG. 6, elastic damping material 360 is interposed between inner surface 353 of inertial disk 354 and surface 352 of lock nut body 342. Flange 356 provides a greater area of surface 352 for adhesion of elastic damping material 360.

Spacer ring 470 of a fourth exemplary preferred embodiment of the present invention is shown in FIG. 7. In this embodiment, a conventional locking nut may be utilized which has no inertial ring or elastic damping material. Spacer ring 470 of the fourth embodiment includes spacer sleeve 472 with bore 474 sized for close sliding fit about arbor shaft 420. Inertial ring 450 is suspended about sleeve 472 by elastic damping material 460 interposed between ring 450 and sleeve 472. When spacer ring 470 is placed on shaft 420 and the locking nut tightened, sleeve 450 is constrained to vibrate with shaft 420. Thus, any vibration of shaft 20 is immediately dampened by deformation of elastic damping material 460 confined between inertial ring 450 and sleeve 472.

Spacer ring 570 of a fifth exemplary embodiment comprising the present invention is shown in FIGS. 8 and 9. As may be seen in the sectional view of FIG. 8, spacer ring 570 comprises spacer sleeve 572 and inertial ring 550. Inertial ring 550 is suspended about sleeve 572 by elastic walled tubes 576 which are filled with viscous, putty-like damping material 560. In the fifth exemplary preferred embodiment of FIG. 8, indentations 578 in inner surface 551 of inertial ring 550 retain tubes 576 in a symmetrical pattern about spacer sleeve 572.

As may be seen in the sectional view of FIG. 9, damping material 560 is retained in tubes 576 by washers 580. Washers 580, tubes 576 and inertial ring 550 are maintained in place on sleeve 572 by retention rings 581. Tubes 576 may be fabricated, for example, of surgical tubing. Possible damping materials for use in tubes 576 include, for example, FLAT PACK TM putty as manufactured by interchemical Corp., St. Louis, Mo. The ends of tubes 576 may also be plugged or thermally fused closed to assure damping material 560 does not escape from therein.

Spacer ring 670 of a sixth exemplary embodiment comprising the present invention is shown in FIG. 10. Inertial ring 650 of spacer ring 670 is retained in position on spacer sleeve 672 by retainer washers 680. In the embodiment of FIG. 9, inertial ring 650 hangs on sleeve 672 and damping force is provided by friction therebetween.

A seventh embodiment is shown in FIG. 11. This embodiment is similar to that shown in FIGS. 8 and 9 except tubes 776 are toroidal and surround spacer sleeve 772.

While an exemplary lathe comprising a preferred embodiment of the present invention has been shown, it will be understood, of course, that the invention is not limited to that embodiment. Modification may be made by those skilled in the art, particularly in view of the foregoing teachings. For example, both a locking nut and spacer ring having an inertial ring suspended by an elastic dumping material may be employed in a lathe comprising the present invention. Further, the inertial mass need not take annular form, but, may be distributed about the shaft in any manner which will maintain proper balance and not result in vibration of the inertial mass during rotation. It is, therefore, contemplated by the appended claims to cover any such modification which incorporates the essential factors of the invention or which encompasses the spirit and scope of the invention.

I claim:
1. A brake lathe comprising;
a lathe body;
an arbor shaft with a base end rotatably mounted on said body and extending from said base end along a longitudinal axis to a free distal end;
mounting means for mounting a hub of a work piece having a longitudinal axis about said arbor shaft to maintain the hub axis and said shaft axis in coincidence and the work piece and said arbor shaft in fixed angular relation about the shaft axis;
motor means for rotating said shaft;
inertia means for providing inertia about said arbor shaft axis, said inertia means including a toroidal body encircling said arbor shaft axis; and,
linking means for linking said inertia means to said arbor shaft, said linking means including a spacer sleeve encircling said arbor shaft and an elastic walled tube containing damping material interposed between said spacer sleeve and said toroidal body.

2. A lathe as in claim 1, in which said damping material comprises a putty material.

3. A lathe as in claim 1, in which said damping material comprises a fluid.

4. A lathe as in claim 1, in which said tube has a longitudinal axis parallel to said arbor shaft axis.

5. A lathe as in claim 1, in which said tube has an axis lying generally in a plane normal to said arbor shaft axis.

* * * * *